US007013056B2

(12) United States Patent
Lin et al.

(10) Patent No.: US 7,013,056 B2
(45) Date of Patent: Mar. 14, 2006

(54) BI-DIRECTIONAL TRANSCEIVER MODULE BASED ON SILICON OPTIC BENCH

(75) Inventors: Song-Fure Lin, Hsinchu (TW);
Pin-Sung Wang, Hsinchu (TW);
Chien-Hsiung Chiu, Hsinchu (TW);
Li-Jen Liu, Taipei (TW)

(73) Assignee: FOCI Fiber Optic Communications, Inc., Hsinchu (TW)

( * ) Notice: Subject to any disclaimer, the term of this patent is extended or adjusted under 35 U.S.C. 154(b) by 63 days.

(21) Appl. No.: 10/772,929

(22) Filed: Feb. 4, 2004

(65) Prior Publication Data
US 2005/0074213 A1    Apr. 7, 2005

(30) Foreign Application Priority Data
Oct. 3, 2003   (TW) .............................. 92217797 U

(51) Int. Cl.
*G02B 6/12*       (2006.01)

(52) U.S. Cl. .......................................... 385/14; 385/49
(58) Field of Classification Search .................. 385/14, 385/49
See application file for complete search history.

(56) References Cited

U.S. PATENT DOCUMENTS

| 4,750,799 | A | * | 6/1988 | Kawachi et al. ............... 385/14 |
| 4,897,711 | A | * | 1/1990 | Blonder et al. ............... 257/48 |
| 5,497,438 | A | * | 3/1996 | Ishikawa et al. ............... 385/38 |
| 5,611,006 | A | * | 3/1997 | Tabuchi ....................... 385/14 |
| 5,862,283 | A | * | 1/1999 | Trott et al. .................... 385/88 |
| 5,937,114 | A | * | 8/1999 | Fisher et al. .................. 385/14 |
| 6,219,470 | B1 | * | 4/2001 | Tu .............................. 385/14 |
| 6,318,908 | B1 | * | 11/2001 | Nakanishi et al. ............ 385/89 |
| 6,406,196 | B1 | * | 6/2002 | Uno et al. ..................... 385/89 |
| 6,722,793 | B1 | * | 4/2004 | Althaus et al. ............... 385/92 |

\* cited by examiner

*Primary Examiner*—Sung Pak
*Assistant Examiner*—Mike Stahl

(57) ABSTRACT

A bi-directional transceiver, integrated module based on a silicon optical bench is provided, which comprises at least a laser diode, at least a signal detector, at least a thin film filter, at least an optical lens, an optical fiber and an SiOB. As the optical signal of specific wavelength can be reflected or inserted by thin film filter, the module has functions of a wavelength division multiplexer and a bi-direction transceiver. Furthermore, the optical lens improves the coupling efficiency between the laser diode and the optical fiber. On the other hand, a plurality of optical elements are integrated on the same SiOB. Hence, only a single optical fiber is used and optical signals of multiple wavelengths can be handled simultaneously.

16 Claims, 11 Drawing Sheets

BI-DIRECTIONAL TRANSCEIVER MODULE BASED ON SILICON OPTIC BENCH

FIELD OF THE INVENTION

The present invention relates to the bi-directional optic transceiver module and, more particularly to a bi-directional transceiver module based on a silicon optical bench (SiOB).

BACKGROUND OF THE INVENTION

Conventional bi-directional transceiver modules with 1550/1310 nm wavelength are utilized in a communication terminal system, such as the broad-band network and the optical fiber cable TV system. An optical transmitter converts an electric signal to an optical signal for transmission, whereas an optical receiver converts the received optical signal to an electric signal. The optical transmitter module connects the modulated light or signal emitted from the front section of a laser diode to an optical fiber. The light transmitted along the optical fiber is converted back to electrical signal at the other end of the optical receiver module.

In general, the optical transmitter and receiver are integrated in a single packaging arrangement module, so that the module is able to simultaneously transmit and receive light signal. Most packaging arrangements are typically assembled in a metal can in that the fabrication process is complicated and expensive. FIG. 1 of the attached drawings shows the structure of a conventional bi-directional transceiver using the "TO-can". The bi-directional transceiver is fabricated with a metal packaging arrangement, including a TO-can laser diode 101, a TO-can signal detector 102, a thin film filter type wavelength division multiplexer 103, an optical fiber 104, and a metal housing case 107.

TO-can laser diode 101 includes a ball lens to convert an electric signal to an optical emitted signal for emission, whereas TO-can signal detector 102 receives an optical signal from the other end, and converts it to an electric signal. Thin film filter type wavelength division multiplexer (WDM) 103 can selectively reflects optical signals of a specific wavelength, by adjusting the reflection angle so that the optical signals are guided to the signal detector. Output optical signal 105 is emitted from TO-can laser diode 101 through thin film filter type wavelength division multiplexer 103, and enters optical fiber 104. Input optical signal 106 emitted from the other end is outputted from optical fiber 104, and reflected by thin film filter type wavelength division multiplexer 103 before entering TO-can signal detector 102. This type of packaging arrangement has many disadvantages. For example, it is an active alignment packaging method that is time-consuming, and the external quantum efficiency may be low due to the high light coupling loss between laser diode and optical fiber. In addition, because the TO-can is assembled with mechanical components, it has a larger size. Therefore, TO-can is suitable for low-speed transmission, but not for high-speed transmission.

FIG. 2 shows the basic structure of another type of transceiver, a planar light circuit, including a laser diode 201 for converting electric signals into optical signals, a signal detector 202 for converting optical signals into electric signals, a wave guide 203, and a substrate 204 for guiding optical signals to signal detector 202 and from laser diode 201 to an optical fiber. An optical transceiver is formed on a substrate to be used as a wavelength division multiplexer. However, as the structure uses only wave guide 203 for wavelength division, its ability in signal division is poor. In addition, as the coupling between laser diode 201 and wave guide 203 is difficult, both the optical loss and the fabrication cost are high.

To improve the poor signal division problem, a thin film filter 301 is added to wave guide 203, as shown in FIG. 3. The thin film filter is to separate the lights of different wavelengths to increase the isolation, and reduce the loss. But, as the coupling loss between laser diode 201 and wave guide 203 is too large, the overall loss of this improved structure is still high. In addition, the special thin film filter is expensive, and the overall fabrication process is complicated.

The silicon optical bench using silicon wafer as a basis and a semiconductor fabrication process is gaining popularity in high precision component production because the technology has the advantages of low material cost, mass productivity, ease of fabrication, and high precision. The function of a wavelength division multiplexer is achieved by installing a thin film filter on a silicon optical bench. Also, by combining optical lenses and silicon optical bench with thin film filters, the goal of high coupling efficiency can be achieved, and the external quantum efficiency can be improved.

However, the alignment design of a silicon optical bench affects the transmission path and the loss rate of the light. Therefore, the laser diode, signal detector, thin film, optical lens, and the locations and sizes of grooves must be accurately designed and produced in order to ensure the light to follow the designed path during reflection, refraction and penetration. During the transmission, the mode of the optical field changes after the light passing optical elements; hence, the optical loss occurs. The light coupling technique is important in reducing the loss. It is, therefore, important to utilize the optical characteristics of each optical element and a high precision production process to improve the mode of optical field, and achieve high coupling efficiency to avoid high loss.

SUMMARY OF THE INVENTION

The present invention is a light coupling and alignment design based on a silicon optical bench. By combining the optical characteristics of each optical element and SiOB production technology, the present invention provides a bi-directional transceiver module that is capable of processing multiple wavelengths. The first object of the present invention is to provide a bi-directional transceiver module based on a silicon optical bench, comprising at least a laser diode, at least a signal detector, at least a thin film filter, at least an optical lens, a groove, an optical fiber, and a silicon optical bench. The present invention utilizes a silicon wafer us a substrate, and utilizes an optical fiber and grooves etched by semiconductor etching process for guiding light. The present invention does not utilize the planar light circuit fabrication process to achieve the planar light guiding. The thin film filter can selectively reflect the optical signals of a specific wavelength to the other direction, and let the rest pass. By adjusting the reflection angle, the optical signals can be reflected to a specific location. Therefore, the thin film filter can separate optical signals of different wavelengths, and the present invention can be used as a WDM. The thin film filter must be placed between the laser diode or the signal detector and the optical fiber. The optical lens and the optical fiber can be combined to improve the light coupling efficiency of the optical signal emitted from the laser diode on its transmission path. The optical lens must be placed between die laser diode and the optical fiber. The signal detector is for receiving, the optical signal of different wavelength transmitted from the other end.

The present invention has the functions of both an optical transmitter and an optical receiver, and uses only a single optical fiber to transmit optical signals. Therefore, the present invention is a bi-directional module. As the entire module is fabricated on a silicon wafer, and the grooves etched by semiconductor etching process is highly precise, the bi-directional transceiver module based on an SiOB can utilize a passive alignment packaging to reduce the difficulty, time, cost of fabrication as well as achieve small size and small optical loss. The present invention is suitable for high-speed transmission.

These and other objects, features and advantages of the invention will be apparent to those skilled in the art, from a reading of the following brief description of the drawings, the detailed description of the preferred embodiment, and the appended claims.

DETAILED DESCRIPTION OF THE PREFERRED EMBODIMENT

Figure 1:
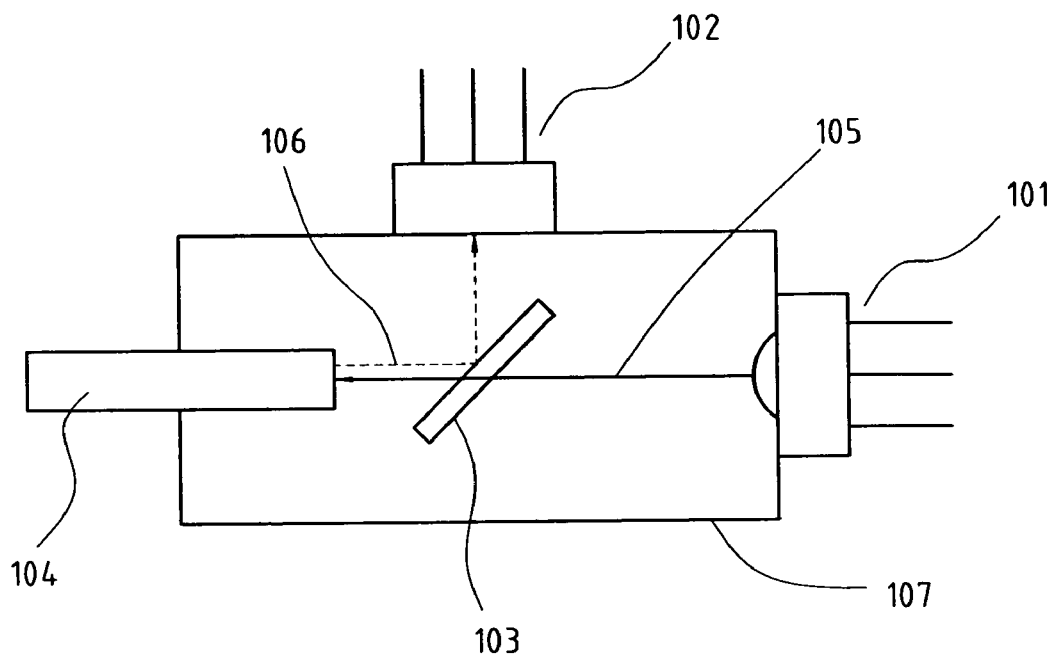
FIG. 1 shows a schematic diagram of a conventional TO-can transceiver module.
Figure 2:
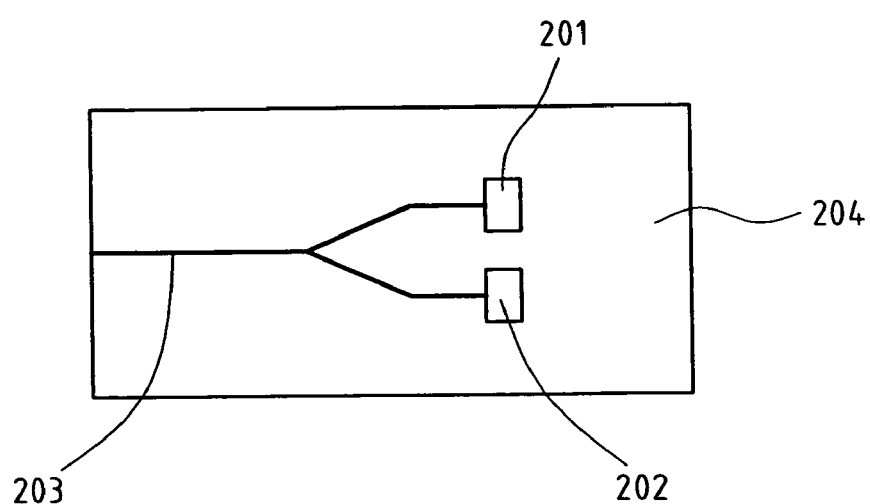
FIG. 2 shows a schematic diagram of a planar light circuit transceiver module.
Figure 3:
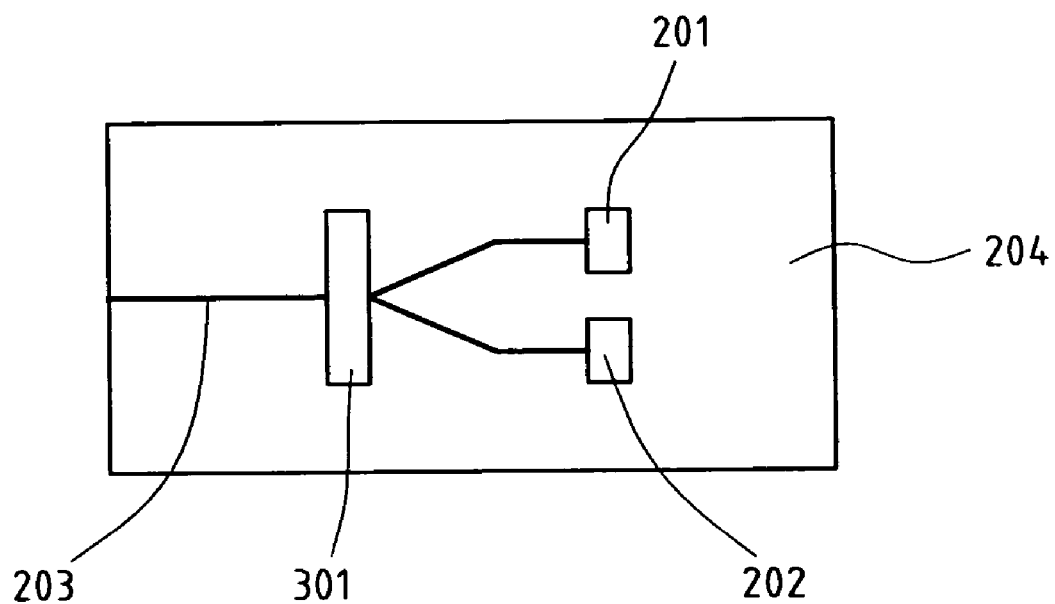
FIG. 3 shows a schematic diagram of a planar light circuit transceiver module with a thin film filter added.
Figure 4:
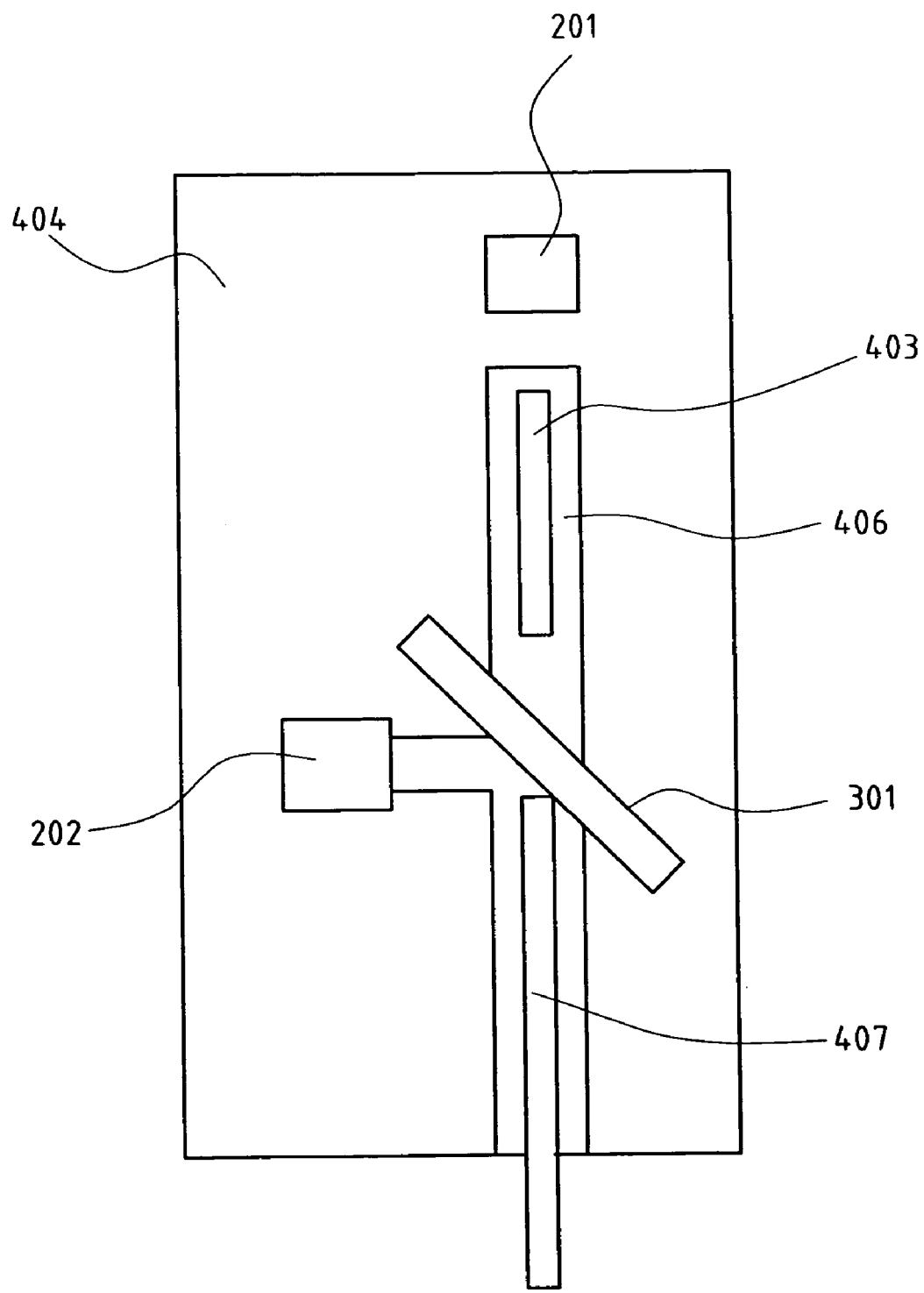
FIG. 4 shows a first embodiment of a bi-directional transceiver module based on a silicon optical bench of the present invention.

FIG. 4 shows a first embodiment of the present invention, comprising a laser diode 201, a signal detector 202, a thin film filter 301, an optical lens 403, a groove 406, an optical fiber 407, and a silicon optical bench 404. Optical lens 403 is placed between laser diode 201 and thin film filter 301 for improving the coupling efficiency of the optical signal emitted from laser diode 201 to optical fiber 407. Thin film filter 301 is placed between optical lens 403, signal detector 202 and optical fiber 407 for reflecting the optical signal transmitted from optical fiber 407 to signal detector 202. All the optical elements are integrated on silicon optical bench 404, and utilize only a single optical fiber 407 for optical signal transmission.

Figure 5:
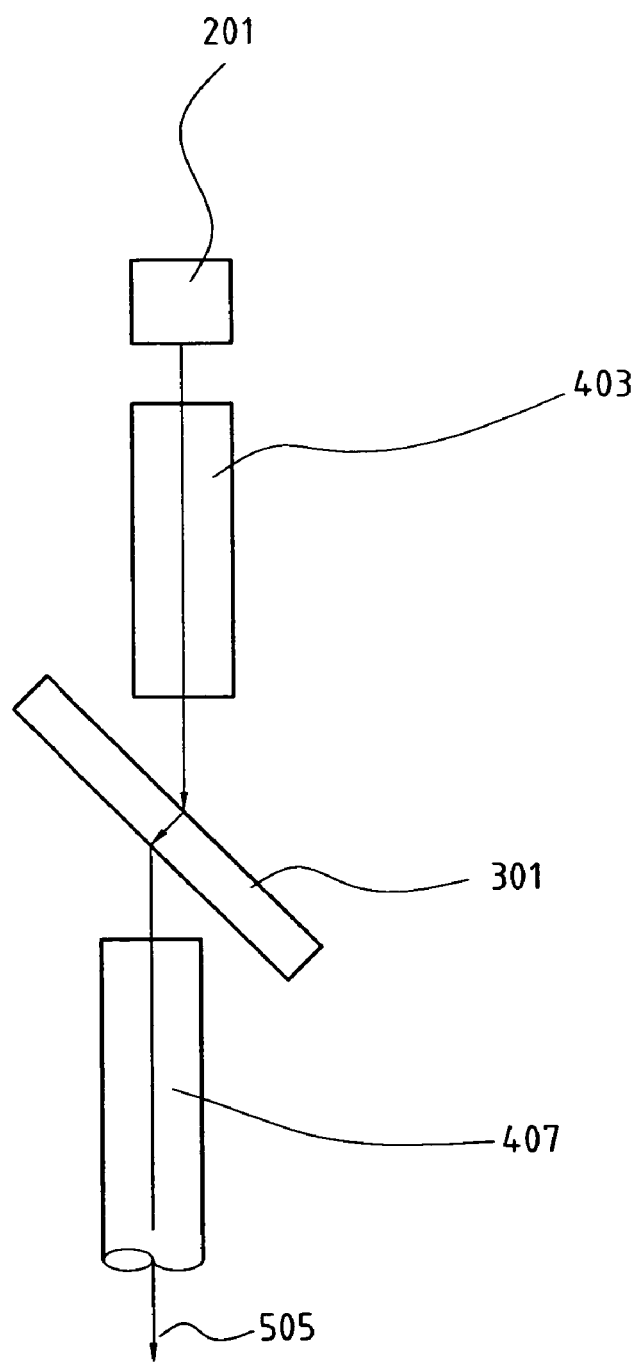
FIG. 5 shows the optical transmitter and output optical signal transmission in FIG. 4.

FIG. 5 shows the optical transmitter of FIG. 4. The optical transmitter comprises a laser diode 201, a thin film filter 301, an optical lens 403, and an optical fiber 407. Output optical signal 505 is emitted from laser diode 201, entering optical lens 403, refracted by thin film filter 301, and finally entering optical fiber 407.

Figure 6:
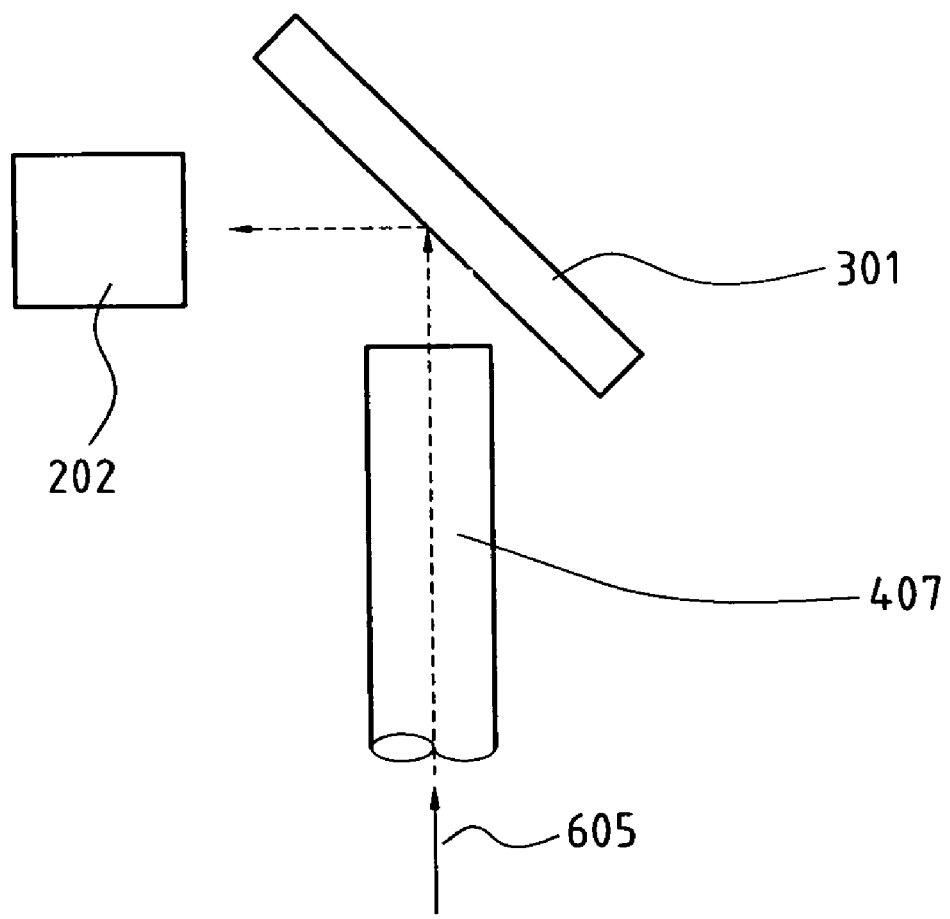
FIG. 6 shows the optical receiver and input optical signal transmission in FIG. 4.
Figure 7:
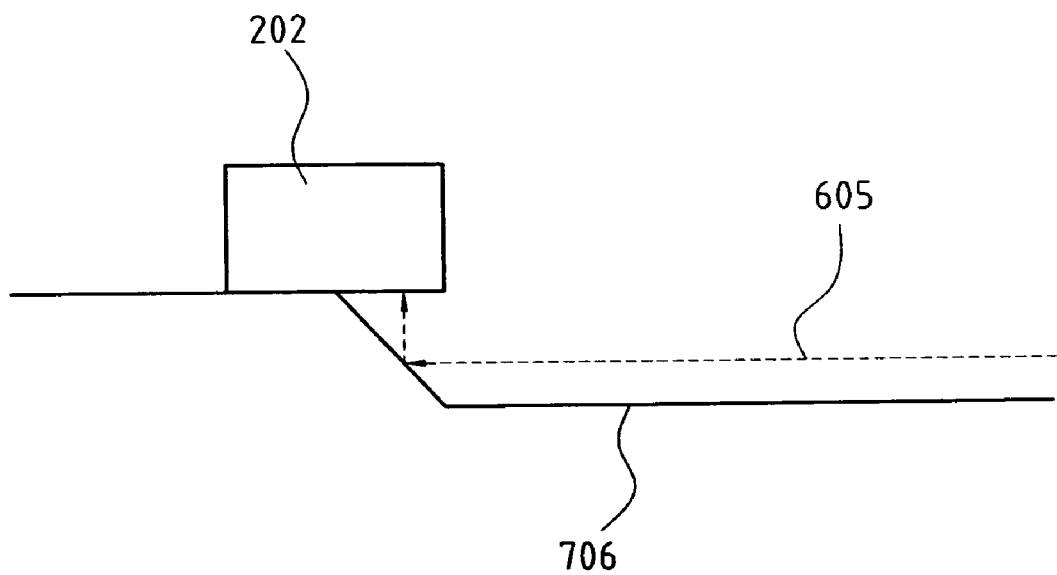
FIG. 7 shows the transmission path of the input optical signals to signal detector in FIG. 4.

FIG. 6 shows the optical receiver of FIG. 4. The optical receiver comprises a signal detector 202, a thin film filter 301, and an optical fiber 407. Input optical signal 605 is transmitted from optical fiber 407, reflected by thin film filter 301 to signal detector 202. Because an optical path through the reflection of thin film filter 301 is reserved for input optical signal 605 during designing the silicon optical bench 404, the reflected input optical signal 605 will travel along reflection groove 706, as shown in FIG. 7. The slant surface at the bottom of reflection groove 706 reflects input optical signal 605 to signal detector 202, where the slant surface at the bottom of reflection groove 706 is coated with a thin film of highly reflective metal to reduce the loss. Because the reflection of input optical signal 605 is upward, the receiving surface of signal detector 202 is downward.

Figure 8:
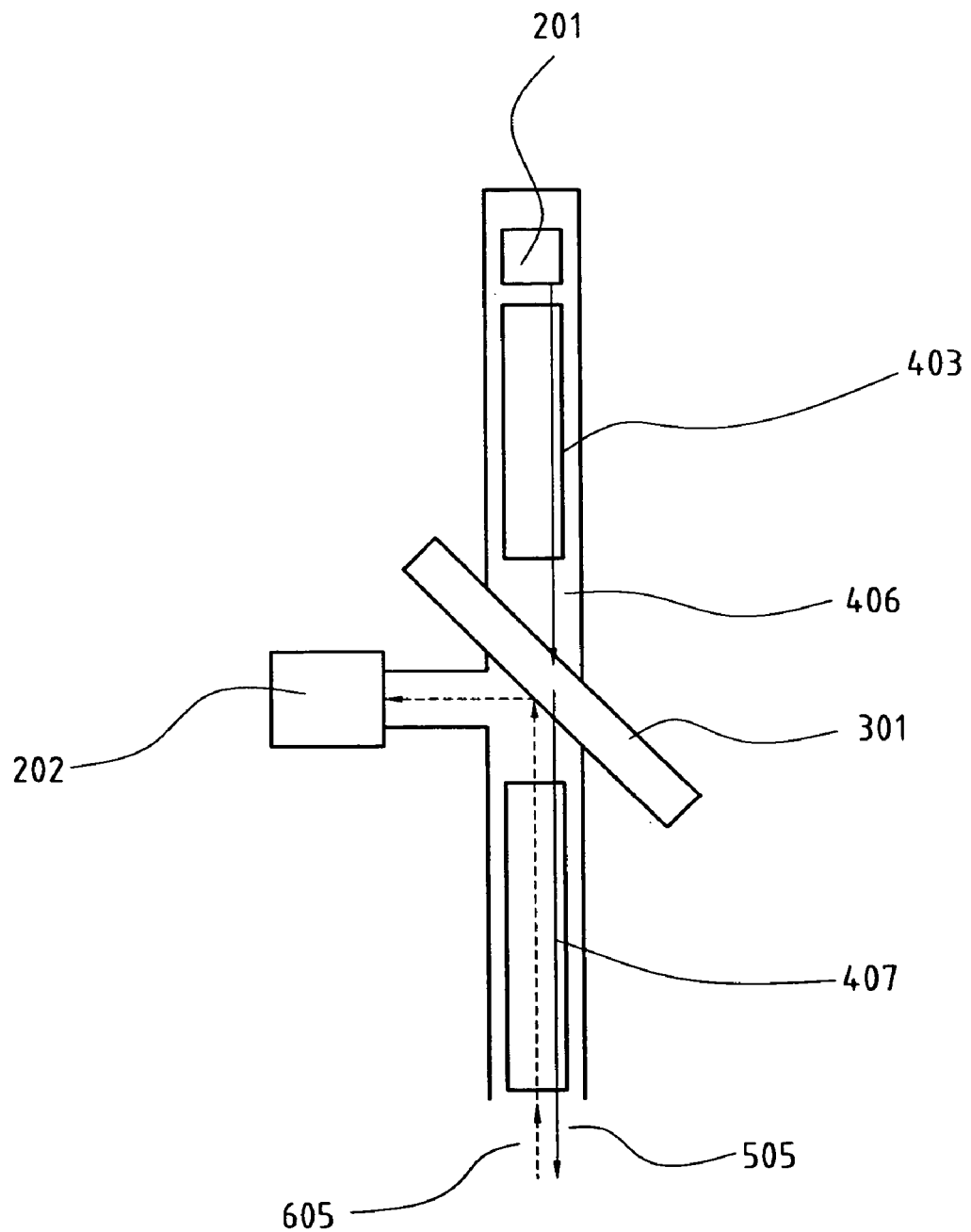
FIG. 8 shows the transmission path of the input and output optical signals in the bi-directional transceiver of FIG. 4.

FIG. 8 shows the transmission path of output optical signal 505 and input optical signal 605. Output optical signal 505 and input optical signal 605 share a single optical fiber 407 for transmission. This is the basic structure of a bi-directional transceiver module. The difference lies in that output optical signal 505 and input optical signal 605 have different transmission direction and different wavelength. The use of thin film filter 301 is to reflect optical signal of a specific wavelength to the other direction, and allows the other optical signal to pass.

For output optical signal 505, the structure can be divided into the first part including from laser diode 201 to thin film filter 301, and the second part including from thin film filter 301 to optical fiber 407. The design of the structure of the first part must take into account the mode of optical field of the output optical signal 505 after its emission from laser diode 201 and passing thin film filter 301. The design of the second part focuses on receiving the output from the first part. In other words, the emphasis is on how to reduce the loss caused by the coupling of optical fiber 407 and output optical signal 505 after its passing thin film filter 301. As can be seen, the mode of optical field from the first part affects the coupling efficiency of the second part. Optical lens 403 can be utilized to adjust the mode of the optical field of the optical signal, in either the first or second part, or both. In the present invention, at least one optical lens 403 is utilized for improving the mode of the optical field.

Figure 9:
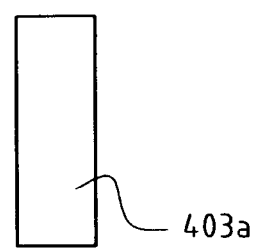
FIG. 9 shows the lenses of various types and shapes according to the present invention.
Figure 9:
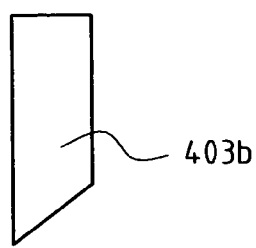
Figure 9:
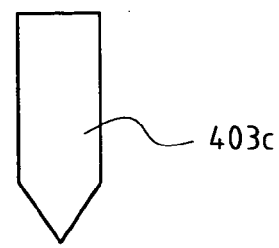
Figure 9:
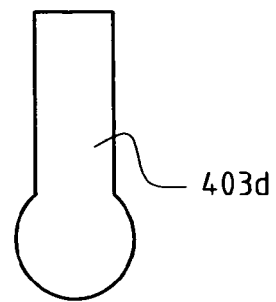
Figure 9:
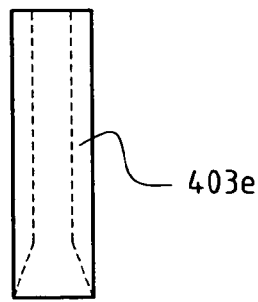
Figure 9:
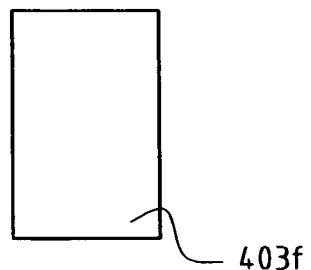
Figure 9:
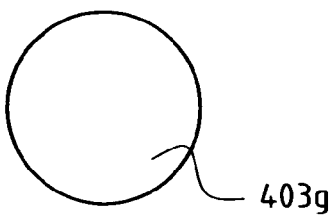
Figure 9:
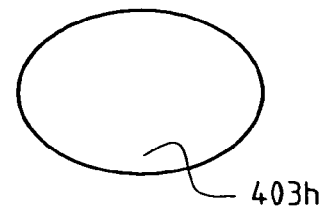
Figure 10:
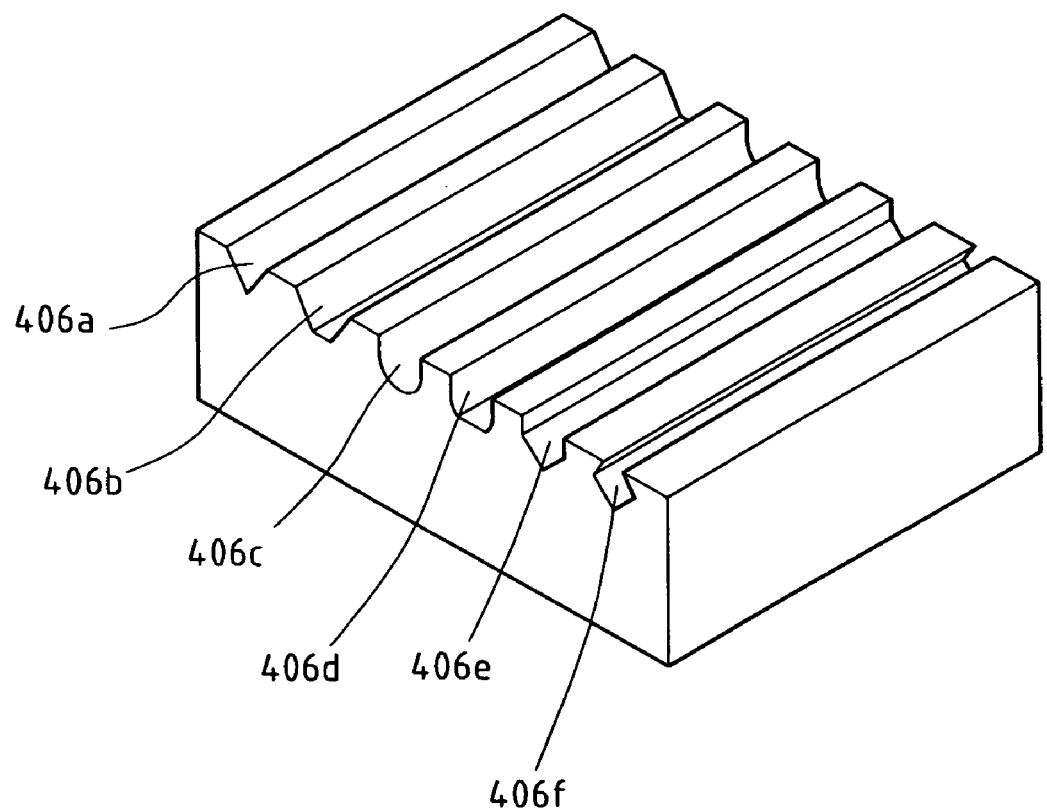
FIG. 10 shows a perspective view of grooves of various shapes according to the present invention.

The optical lenses can be divided into three categories: (1) flat-tip optical fiber, referring to utilizing an optical fiber and cut the tip flat, as shown in FIG. 9, the cut can be straight 403a, or slanted 403b, (2) optical fiber lens, including conic optical fiber lens 403c, arch optical fiber lens 403d, and thermally-diffusion expand core fiber TEC fiber) 403e, and (3) lens, including gradient index lens (GRIN lens) 403f, ball lens 403g, and aspheric lens 403h. The flat-tip optical fibers 403a and 403b are the most commonly utilized structure. The optical fiber lens refers to making the tip of an optical fiber into a lens. The TEC fiber 403e refers to utilizing heat to expand the core of an optical fiber. The present invention utilizes the aforementioned types of optical lenses to improve the coupling efficiency of the optical fiber and the laser diode.

For input optical signal 605, the structure can also be divided into the first part including from optical fiber 407 to thin film filter 301, and the second part including from thin film filter 301 to signal detector 202. Because the present invention is a bi-direction transceiver module, the overall design must take into account that the same optical element may produce different effect on lights of different wavelength. Therefore, the first part and the second part of the present invention may utilize different combination of optical elements to achieve low cost, high efficiency, and ease of mass production.

The SiOB utilizes the semiconductor etching process for fabricating, therefore, it is highly precise in alignment and allowance for expansion. Groove 406 in the present invention is for guiding light, and it requires high precision in alignment. Using the special lattice structure of the silicon wafer and development etching technique, the precision requirement can be easily met. Groove 406 can have different shapes to meet the requirement of different optical signals, such as V-shaped groove 406a, V-shaped with flat bottom groove 406b, U-shaped groove 406c, U-shaped with flat bottom groove 406d, necktie-shaped groove 406e, and rhombus-shaped groove 406f.

In order to fully explore the high precision in alignment and allowance for expansion in an SiOB, the present invention integrates an optical transmitter, an optical receiver and other optical elements into a silicon optical bench to make a bi-directional transceiver module. Furthermore, the thin film filter is utilized to selectively reflect or pass optical signals of specific wavelength, so that it can act as a WDM. Therefore, by combining a plurality of optical transmitters, a plurality of optical receivers, and a plurality of thin film filters, the present invention can be used as a multiple wavelengths WDM, bi-directional with a single optical fiber.

Figure 11:
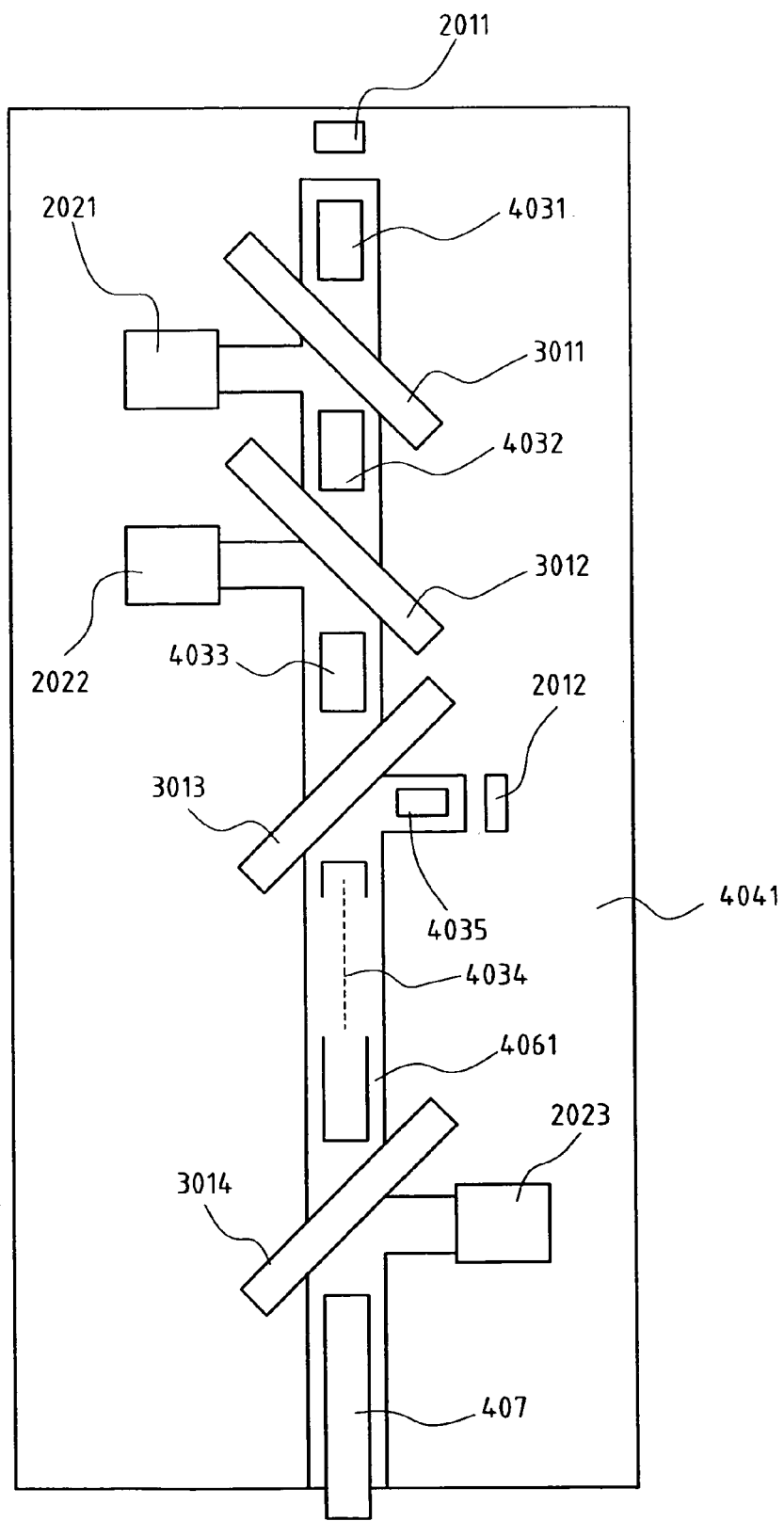
FIG. 11 shows a second embodiment of a bi-directional transceiver module based on an SiOB according to the present invention.

FIG. 11 shows the second embodiment of the present invention, a bi-directional transceiver module capable of processing multiple wavelengths. Two laser diodes 2011, 2012, and thin film filter 3013 are placed on a rectangular SiOB 4041. The two diodes 2011, 2012 can emit two optical signals of different wavelengths. Groove 4061 and optical fiber 407 are utilized for guiding and transmitting optical signals. Three signal detectors 2021, 2022, 2023 and corresponding thin film filters 3011, 3012 and 3014 are utilized for receiving optical signals of three different wavelengths. The entire transceiver module utilizes five optical lenses 4031–4035 to adjust the mode of the optical field to improve coupling efficiency. This embodiment is able to transmit two optical signals and receive three optical signals, all of different wavelengths.

Figure 12:
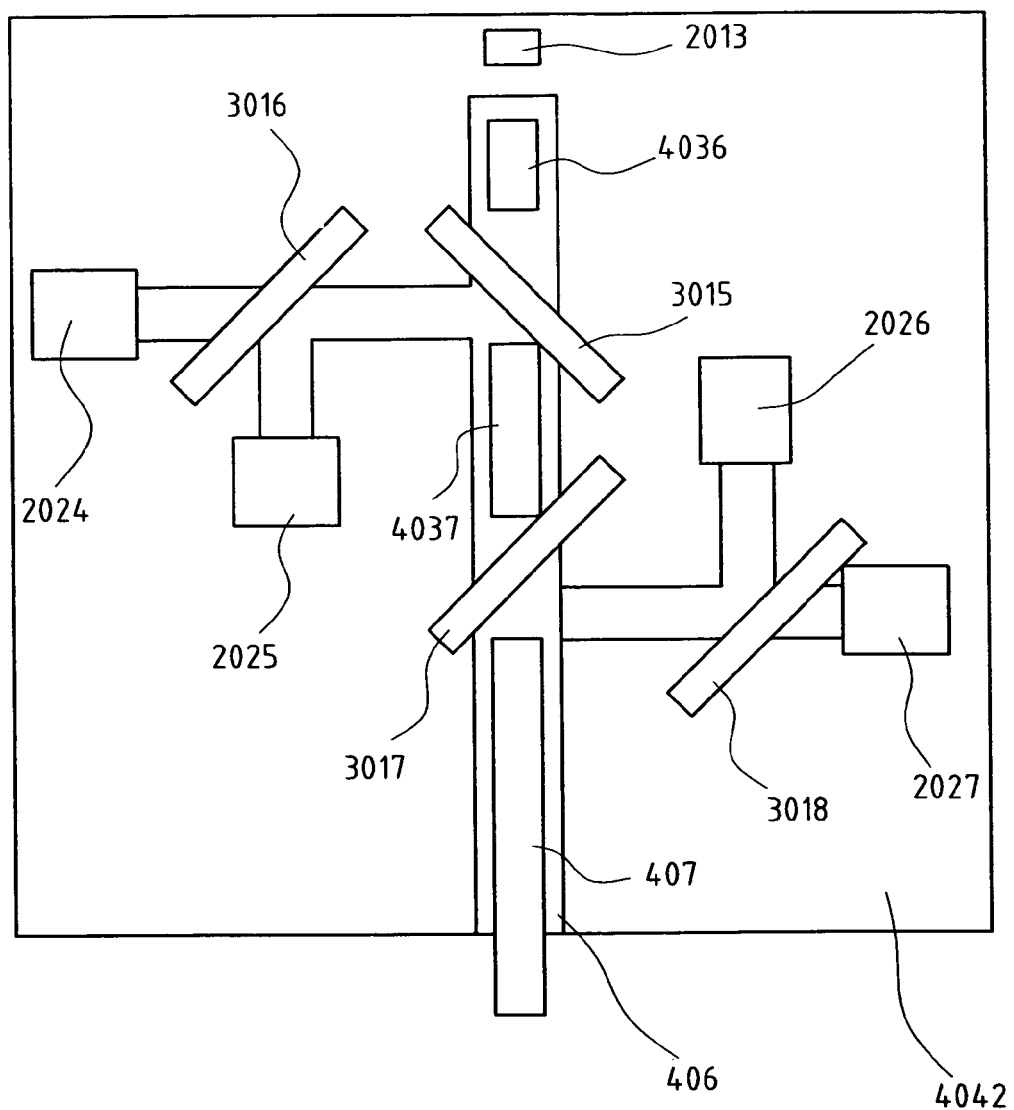
FIG. 12 shows a third embodiment of a bi-directional transceiver module based on an SiOB according to the present invention.

FIG. 12 shows the third embodiment of the present invention. By varying groove 4062, this embodiment uses a square SiOB 4042 to meet a different application requirement. In this embodiment, a laser diode 2013 emits an optical signal, groove 4062 and optical fiber 407 are for guiding and transmitting optical signals, four signal detectors 2024–2027 with corresponding thin film filters 3015–3018 are for receiving four optical signals simultaneously, and two optical lenses 4036, 4037 are used to adjust the mode of the optical field and reduce coupling loss.

Therefore, the present invention is applicable and can be extended to place a plurality of optical transmitters and a plurality of optical receivers on a silicon optical bench. By utilizing a plurality of thin film filters of various optical characteristics, such as reflection angle, the present invention can act as a multiple wavelengths, bi-directional transceiver module with a single optical fiber. In addition, a plurality of optical lenses can be placed in the present invention to adjust the mode of the optical fields and improve the coupling efficiency. So that, the present invention is able to provide a low-cost, multi-wavelength-function, high coupling efficiency, and easy to fabricate bi-directional transceiver module.

While the invention has been described in connection with what is presently considered to the most practical and preferred embodiment, it is to be understood that the invention is nor to be limited to the disclosed embodiment, but, on the contrary, it should be clear to those skilled in the art tat the description of the embodiment is intended to cover various modifications and equivalent arrangement included within the spirit and scope of the appended claims.

What is claimed is:

1. A bi-directional transceiver module based on a silicon optical bench, comprising:
    an optical fiber for transmitting optical signals;
    at least a laser diode for emitting optical output signals of a specific wavelength, said optical output signals being transmitted through said optical fiber;
    at least a signal detector for receiving optical input signals of a specific wavelength from said optical fiber;
    at least a thin film filter placed between said laser diode or said signal detector and said optical fiber, for reflecting or inserting said optical input or output signals of a specific wavelength in order to change the light transmission path of said optical signals;
    at least an optical lens placed between said laser diode and said optical fiber for improving mode of optical field and light coupling efficiency between said laser diode and said optical fiber;
    a groove for guiding said optical output signals in a first transmission path to said optical fiber, or guiding said optical input signals in a second transmission path to said signal detector, said first and second transmission paths being split by said thin film filter and perpendicular to each other on a same plane within said groove; and
    a silicon optical bench made of a silicon wafer, said silicon optical bench integrating said optical fiber, said laser diode, said signal detector, said thin film filter, said optical lens and said groove into a module using a packaging;
    wherein said groove has a slanted bottom surface for reflecting said optical input signals upward in a third transmission path perpendicular to said first and second transmission paths, and said signal detector is positioned above said slanted bottom surface with a receiving surface facing downward for receiving said optical input signals.

2. The module as claimed in claim 1, wherein said packaging is a passive alignment packaging.

3. The module as claimed in claim 1, wherein said optical lens is a straight-cut flat-tip optical fiber.

4. The module as claimed in claim 1, wherein said optical lens is a slant-cut flat-tip optical fiber.

5. The module as claimed in claim 1, wherein said optical lens is a conic optical fiber lens.

6. The module as claimed in claim 1, wherein said optical lens is an arch optical fiber lens.

7. The module as claimed in claim 1, wherein said optical lens is a thermally-diffusion expand core fiber lens.

8. The module as claimed in claim 1, wherein said optical lens is a gradient index lens.

9. The module as claimed in claim 1, wherein said optical lens is a ball lens.

10. The module as claimed in claim 1, wherein said optical lens is an aspheric lens.

11. The module as claimed in claim 1, wherein said slanted bottom surface of said groove is coated with a thin film of highly reflective metal.

12. The module as claimed in claim 1, wherein said groove is a V-shaped groove.

13. The module as claimed in claim 1, wherein said groove is a V-shaped groove with flat bottom.

14. The module as claimed in claim 1, wherein said groove is a U-shaped groove.

15. The module as claimed in claim 1, wherein said groove is a U-shaped groove with flat bottom.

16. The module as claimed in claim 1, wherein said groove is a necktie-shaped groove.

\* \* \* \* \*